US008517382B1

(12) United States Patent
Pagliuca

(10) Patent No.: US 8,517,382 B1

(45) Date of Patent: Aug. 27, 2013

(54) GAME MACHINE

(71) Applicant: Henry Pagliuca, Belleville, NJ (US)

(72) Inventor: Henry Pagliuca, Belleville, NJ (US)

(*) Notice: Subject to any disclaimer, the term of this patent is extended or adjusted under 35 U.S.C. 154(b) by 0 days.

(21) Appl. No.: 13/656,813

(22) Filed: Oct. 22, 2012

(51) Int. Cl.
*A63F 5/00* (2006.01)
*A63F 13/00* (2006.01)

(52) U.S. Cl.
USPC ............. 273/142 E; 273/274; 463/17; 463/27

(58) Field of Classification Search
USPC .................... 273/142 E–142 H, 274; 463/17, 463/27
See application file for complete search history.

(56) References Cited

U.S. PATENT DOCUMENTS

| | | | | |
|---|---|---|---|---|
| 1,824,677 | A | 9/1931 | Wright | |
| 2,104,740 | A | 1/1938 | Evans | |
| 2,127,261 | A | 8/1938 | Kramer et al. | |
| 3,090,623 | A | 5/1963 | Dugan | |
| 3,818,628 | A | 6/1974 | Ensmann et al. | |
| 4,391,442 | A | 7/1983 | Levy | |
| 4,601,470 | A * | 7/1986 | Kadota et al. | 273/142 E |
| 4,735,416 | A | 4/1988 | McNally | |
| 4,840,375 | A | 6/1989 | Lawlor et al. | |
| 4,869,505 | A | 9/1989 | Manabe | |
| 4,906,005 | A | 3/1990 | Manabe | |
| 5,332,217 | A | 7/1994 | Gottlieb | |
| 5,553,851 | A * | 9/1996 | Malavazos et al. | 273/142 E |
| D391,994 | S | 3/1998 | Hanscom et al. | |
| 6,083,105 | A | 7/2000 | Ronin et al. | |
| 6,520,854 | B1 | 2/2003 | McNally | |
| 6,824,463 | B1 | 11/2004 | Yamaguchi et al. | |
| 7,926,810 | B2 * | 4/2011 | Fisher et al. | 273/274 |
| 2005/0014550 | A1 * | 1/2005 | Rhoten | 463/17 |
| 2007/0010312 | A1 * | 1/2007 | Ike et al. | 463/17 |

* cited by examiner

*Primary Examiner* — Benjamin Layno

(57) ABSTRACT

A game machine has a controller with one or more consoles for recording a player's bet. The machine also has a motor-driven, concave wheel with a plurality of circumferentially spaced compartments. Each compartment can hold temporarily and release the ball. The wheel can produce an outcome signal indicating ball rest position. The controller can signal whether a player's bet has won based on the outcome signal. The base supporting the wheel has a return track for sending the ball released from the wheel to one or more elevators. The elevator can lift the ball to an associated ball striker that can propel the ball back to the wheel. The machine can have one or more stations for propelling the ball.

33 Claims, 9 Drawing Sheets

GAME MACHINE

BACKGROUND OF THE INVENTION

1. Field of the Invention

The present invention relates to game machines, and in particular, to machines that can shoot a ball and can be played without an attendant.

2. Description of Related Art

Games of chance are very popular and gambling is becoming legal in more jurisdictions. In casinos many such games are run by a casino representative such as a croupier or dealer. Because of the large amount of funds involved, a second casino representative may observe the play to preclude any improper or dishonest activity.

Popular games of chance often involve propelling or throwing an object and observing an outcome. For example dice can be rolled and their markings observed when they come to rest.

A conventional roulette wheel will have 36 numbered compartments and one or two additional compartments marked 0 and 00. Bets are placed on a long table marked with a grid that allows players to place wagers on individual numbers or on combinations of numbers. After bets are placed, the roulette croupier will spin the roulette wheel and roll a ball along its periphery, allowing the ball to tumble across the compartments of the wheel, finally coming to rest in one of the marked compartments.

For all of these manually played games, the casino employees must observe the winning outcome while still making sure none of the gamblers change any of the previously placed bets. After ascertaining the outcome, the losing chips must then be gathered and winnings delivered to the winning players. All of this activity must be done quickly and precisely, knowing that errors can result in significant funds being misapplied. Understandably, the casino employees running these games operate under stressful conditions and must be highly skilled. The salaries for running these games of chance are a significant percentage of the casino's overhead.

Salary overheads are essentially eliminated with some automated games of chance such as slot machines. Modern slot machines are computer-controlled and the traditional mechanical wheels have been replaced by virtual wheels appearing on a computer-driven display. These slot machines are able to accept funds from a gambler and automatically add and subtract from this fund based on the player's wins and losses.

All the sights and sounds produced by automated games of chance are designed to attract players and maintain their interest. Still, many players become bored with an automated machine lacking any visible mechanical apparatus such as a traditional roulette wheel.

See also U.S. Pat. Nos. 1,824,647; 2,104,740; 2,127,261; 3,090,623; 3,818,628; 4,391,442; 4,735,416; 4,840,375; 4,869,505; 4,906,005; 5,332,217; 6,083,105; 6,520,854; 6,824,463; and D391,994.

SUMMARY OF THE INVENTION

In accordance with the illustrative embodiments demonstrating features and advantages of the present invention, there is provided a game machine that is played with a ball. The machine includes a motor-driven, concave wheel with a plurality of circumferentially spaced compartments. Each compartment is operable to hold temporarily and release the ball. The wheel is operable to produce an outcome signal indicating ball rest position. Also included is at least one ball striker for propelling the ball along a shooting path into the wheel. The machine includes a base for rotatably supporting the wheel. The base has a return track for directing the ball upon release from the wheel toward a position below the at least one ball striker. Also included is an elevator for lifting the ball from the return track to the at least one ball striker. The machine includes a controller coupled to the wheel. The controller has at least one console manually operable to record in the controller a player's bet. The controller is operable to provide a signal indicating whether the player's bet has won based on the outcome signal.

By employing apparatus of the foregoing type an improved game of chance is created. In the disclosed embodiment a motor-driven roulette wheel has a number of ball compartments. This wheel can detect the compartment in which a ball may land. Have been the disclosed embodiment the game machine will be fully automated and controlled by a computer such as a microcontroller.

The ball compartments in the disclosed roulette wheel have mechanically operated doors that can open to allow a ball to fall below the wheel. As disclosed, the ball will roll across the floor of an underlying basin and enter a return track that leads to an elevator shaft. An elevator at the elevator shaft can lift the ball to position adjacent to a solenoid. The solenoid can be actuated to propel the ball along a trajectory wherein the ball orbits around and falls into the roulette wheel in the usual way.

A disclosed embodiment can simulate launching of the ball with a player-operated plunger. Upon detecting plunger motion the system will contemporaneously operate the solenoid, giving the player the illusion that the plunger actually launched the ball.

The disclosed embodiments can accommodate a single or multiple players, each player having a betting console. The multiple player embodiments can have players seated around a circular table with the roulette wheel at the center, or around a more traditional long rectangular table with the roulette wheel at one end. And Simulation of a ball being launched by a plunger is optional, but is used in the embodiment employing a circular table. In this embodiment plungers will be installed at each of the several player stations. A ball dropped from the roulette wheel can be returned to any one of the players' stations by returning the ball along a descending circular track. A series of elevator shafts distributed along the circular track are each fitted with a movable piston that is normally positioned even with the circular track to allow the ball to pass by. Just one of these pistons will be depressed so that the ball will fall into the elevator shaft and land atop the depressed piston. Thereafter the piston will rise to bring the ball to a shooting station assigned to one of the several players. As before, the system can detect plunger motion to operate a solenoid that propels the ball back to the roulette wheel.

While operation of a plunger may be the trigger for launching the ball, the system can automatically launch a ball if bets have been placed and a predetermined waiting interval has passed.

BRIEF DESCRIPTION OF THE DRAWINGS

The above brief description as well as other objects, features and advantages of the present invention will be more fully appreciated by reference to the following detailed description of illustrative embodiments in accordance with the present invention when taken in conjunction with the accompanying drawings, wherein.

DETAILED DESCRIPTION OF THE PREFERRED EMBODIMENTS

Figure 1:
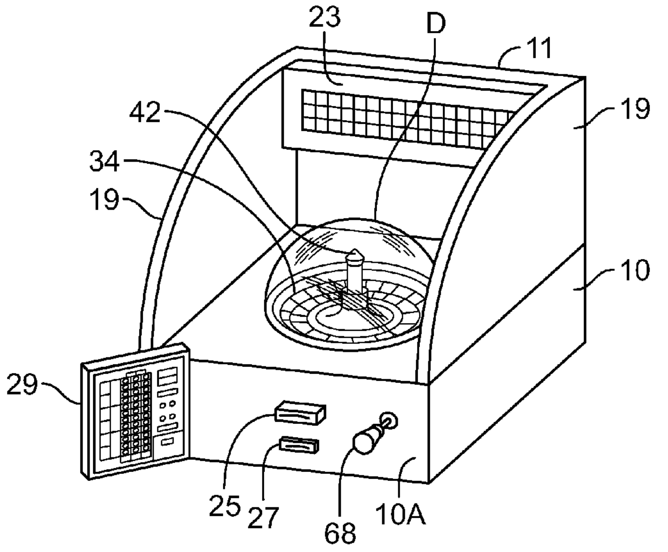
FIG. 1 is a perspective view of a game machine in accordance with principles of the present invention.
Figure 2:
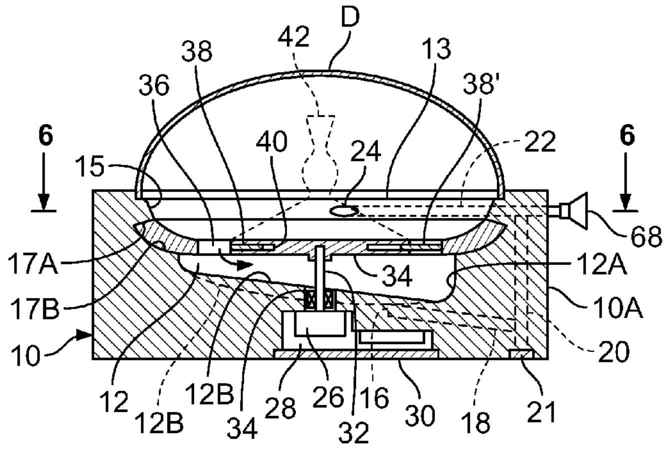
FIG. 2 is an elevational view, partly in section, of the game machine of FIG. 1.
Figure 3:
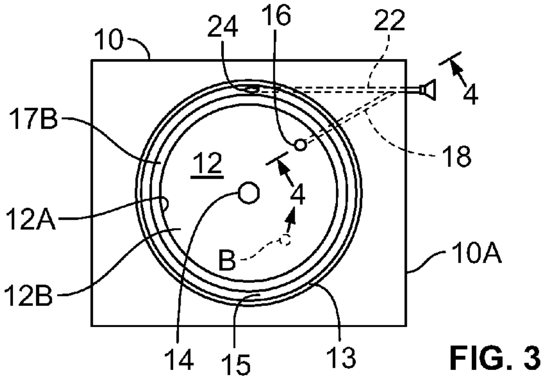
FIG. 3 is a plan view of the base of FIG. 1.

Referring to FIGS. 1-3, a game machine is shown with a base 10 having a square footprint and four vertical sidewalls, the front being identified as sidewall 10A. Mounted on front wall 10A is currency accepting device 25, which is able to read paper money and verify its authenticity and denomination. Mounted thereunder is a printing outlet 27 for issuing winnings certificates as well as receipts indicating the amounts wagered. Mounted at an angle to the right of front wall 10A is a player console 29, which will be described presently.

Mounted vertically atop base 10 are rectangular back panel 11 and two side panels 19. Side panels 19 are pie-shaped and encompass a 90° arc. Display panel 23 is mounted along the top edge of back panel 11.

The top of base 10 has a concavity whose circular rim is notched to form a circular shelf 13 that is fitted with transparent plexiglas dome D. Immediately below shelf 13 is a bevelled sidewall 15 located over an undercut comprising annular overhang 17A overhanging a curved annular wall 17B. Wall 17B funnels into lower basin 12, which has an upright circular sidewall 12A connecting through a rounded corner to a flat circular floor 12B with a concentric shaft hole 14.

If a ray from hole 14 perpendicularly intersecting sidewall 10A is considered the three o'clock position, circular outlet hole 16 is at approximately the 2 o'clock position adjacent to sidewall 12A. Floor 12B is tilted about a horizontal axis running from the eleven to five o'clock positions so that outlet hole 16 is at the lowest point of floor 12B. Accordingly, game ball B (shown in phantom in FIG. 3) will tend to roll along floor 12B and fall into hole 16.

Hole 16 descends vertically and intersects the proximal end of a circular bore identified herein as return track 18. Track 18 is inclined downwardly and travels along a radially extending, vertical plane. The distal end of track 18 intersects an upright, circular elevator shaft 20 about ⅙ of the way up from its bottom, which is closed by plug 21. Shaft 20 is located near the front right corner of base 10 and rises to intersect a horizontal circular bore identified herein as shooting path 22. Path 22 extends perpendicularly from the front sidewall 10A to tangentially intersect beveled annular surface 15 to form elliptical outlet 24 therein. Shafts 18, 20 and 22 as well as holes 16 and 24 are sized to accommodate passage of ball B.

As shown in FIG. 2 a cavity 28 on the underside of base 10 contains motor 26 and is closed with cover 30. Motor shaft 32 is mounted in bearing 34, which is mounted in the previously mentioned concentric hole (hole 14 of FIG. 3).

Figure 4:
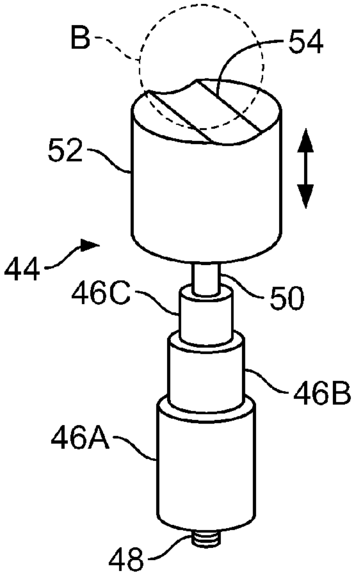
FIG. 4 is a perspective view of the elevator installed in the elevator shaft of FIG. 2.
Figure 5:
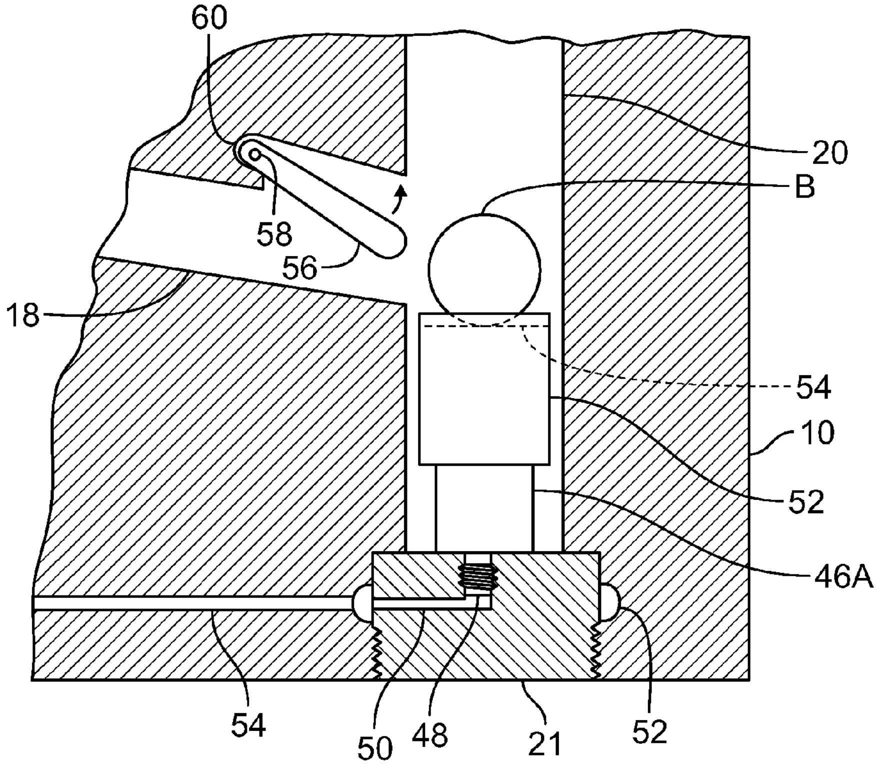
FIG. 5 is a detailed, fragmentary, elevational view of the elevator shaft of FIG. 2, partly in section, and showing its intersection with the return track.

Referring to FIGS. 4 and 5, elevator 44 is shown as a telescopic actuator having three telescopically interconnected cylinders 46A, 46B, and 46C, which can be extended or retracted by applying pneumatic pressure to threaded fitting 48. Piston rod 50 projects upwardly from cylinder 46C to cylindrical piston 52, which has on top a transverse gully 54 with a curvature designed to match that of ball B.

Fitting 48 is shown threaded into an axial bore in plug 21 that communicates with radial passage 50 in the plug. With plug 21 screwed into position as shown, passage 50 communicates with an annular groove 52 that in turn communicates with pneumatic passage 54 in base 10. With no pressure applied to passage 54 piston 52 retracts to the position shown FIG. 5. As pressure is applied piston 52 rises, with FIG. 4 showing a partial lifting of the piston.

The distal end of return track 18 has a gate in the form of tongue 56 pivotally mounted on axle 58. Gate 56 is shown in the neutral position where it can prevent ball B from returning back into track 18. On the other hand, gate 56 will be lifted when a ball rolling down track 18 encounters the gate. It will be appreciated that gully 54 in piston 52 need not align with track 18 since the uppermost parts of the piston are lower than the bottom of track 18.

Figure 6:
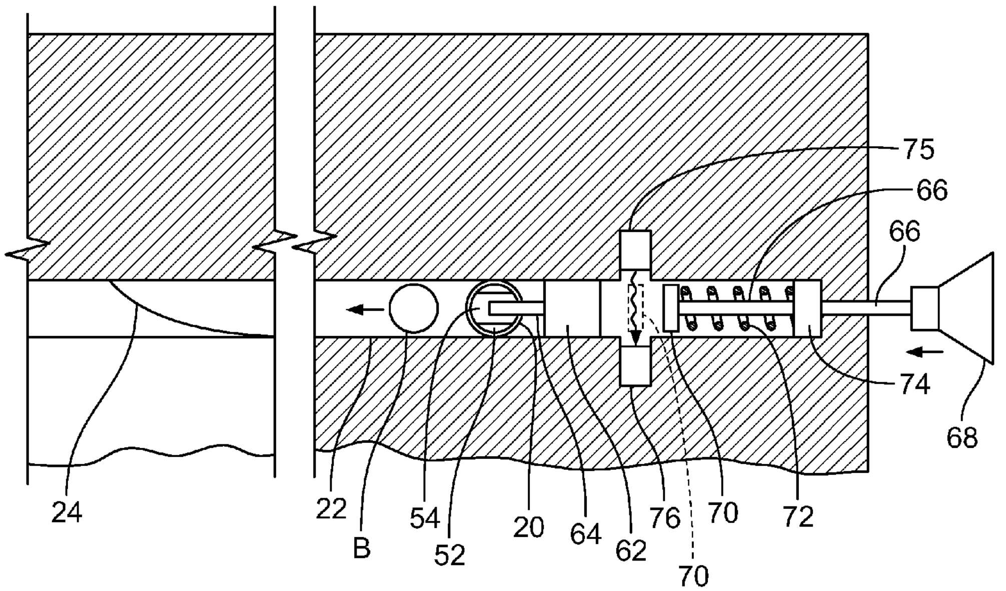
FIG. 6 is a detailed, fragmentary, plan view, partly in section through the shooting path in the base of FIG. 2.

Referring to FIG. 6, piston 52 is shown fully extended in elevator shaft 20 with its gully 54 axially aligned with cylindrical shooting path 22 to provide a smooth transition from piston to shooting path. A ball striker is shown as solenoid 62 with magnetically actuatable arm 64 used to propel ball B along path 22 to opening 24.

A manually operable plunger is shown as rod 66 with a handle 68 at its distal end. Compression spring 72 encircles rod 66, bears against element 74, and biases striker disk 70 inwardly. Handle 68 is shown moving inwardly after being released. Eventually, disk 70 reaches the position shown in phantom, where it interrupts the light beam transmitted by light source 75. Accordingly, light no longer reaches light detector 76, which then acts like a switch that has closed. When however, handle 68 is withdrawn as shown, light detector 76 acts like a switch that is open. Elements 75 is herein referred to as a plunger sensor for producing a shoot signal.

In some embodiments, elements 75 and 76 may be replaced with a mechanical switch. In still other embodiments elements 75 and 76 may be replaced with a transducer that is struck by striker disk 70 and produces a signal indicating the momentum or impulse of any force produced by the striker disk.

In some cases element 74 may be an optional transducer mounted in the distal end of path 22 and encircling rod 66 in order to produce a signal indicating movement of the rod. In that case, transducer 74 is considered part of the plunger sensor for producing a shoot signal.

Referring again to FIGS. 1-3, concave wheel 34 is shown supported on the upper end of previously mentioned shaft 32. Wheel 34 is shown mounted under overhanging surface 17A. It will be appreciated that for practical reasons, base 10 may be built from several interconnecting parts, which will allow wheel 34 to be mounted under the overhang as shown.

In this embodiment wheel 34 is designed as a roulette wheel having 38 circumferentially spaced compartments 36, marked in the usual fashion with the numbers 1-36, 0, and 00. Also in the usual fashion, compartments 36 are marked red alternating with black, except for numbers 0 and 00, which are marked green.

Each compartment 36 has a door 38 that can slide horizontally into pocket 40. Door 38 is shown open while door 38' is shown closed. Each of the doors 38 can be individually operated by equipment in pedestal 42 (pedestal shown in phantom in FIG. 2). Doors 38 can be operated pneumatically, magnetically, or mechanically, and wheels of this type can purchased from Hai Wei International, located in the city of LiuZhou, in the Guangxi province of mainland China (PRC).

Wheels of this type include a detector for sending a signal indicating in which of the compartments 36 a ball has landed. For example, when a ball lands in one of the compartments 36, the ball can interrupt light that fans outwardly from pedestal 42, so that a plurality of light detectors (not shown) distributed along the periphery of wheel 34 can detect this light interruption and determine ball position.

Figure 7:
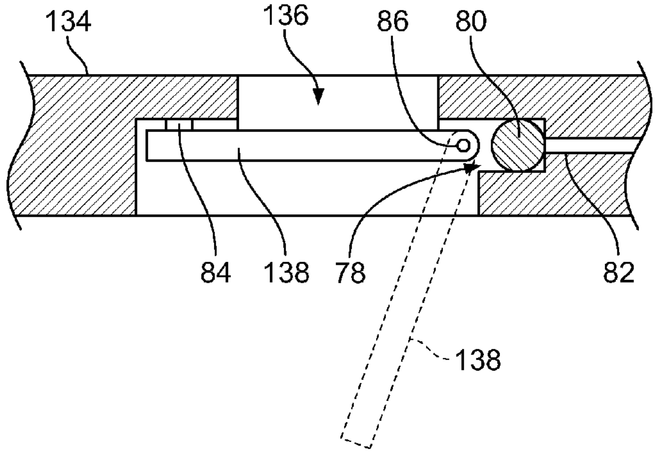
FIG. 7 is a detailed, fragmentary view of the partly in section through a compartment of a wheel that is an alternate to that of FIG. 1.

Referring to FIG. 7, an alternate wheel 134 has a plurality of circumferentially spaced compartments 136 each fitted with a trapdoor 138. A torsion spring 86 provides a pivot point tending to rotate door 138 from the open position shown in phantom to the closed position shown in full. Door 138 is electrically conductive and in the illustrated closed position provides continuity to electrical contact 84 secured on wheel 134. Contact 84 acts as a door sensor.

Groove 78 extends 360° around wheel 134 and is fitted with an O-ring 80 illustrated in its retracted position. Pneumatic pressure applied through conduit 82 will drive O-ring 80 outwardly to bear against the end of door 138 thereby preventing rotation of the door.

Figure 8:
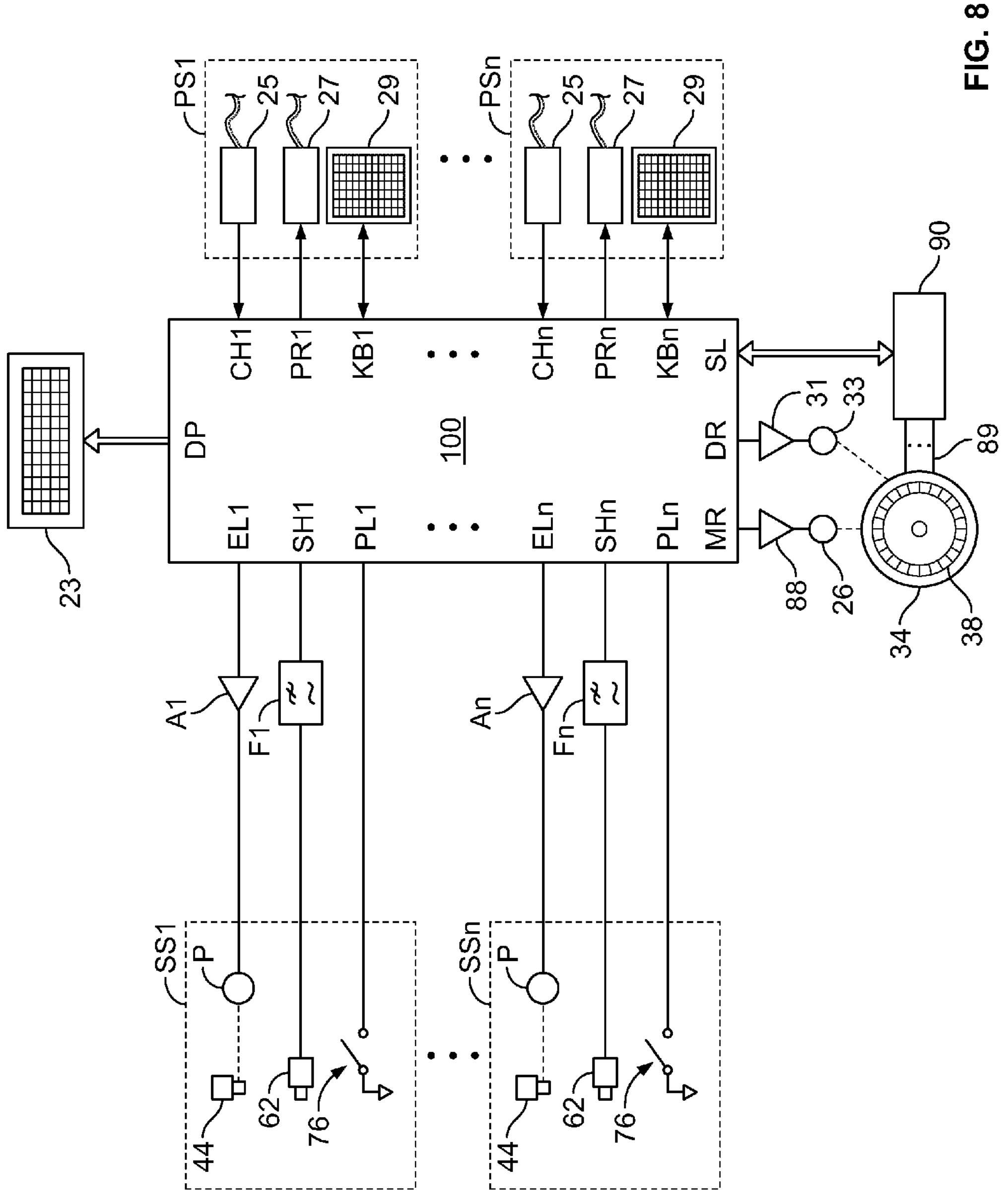
FIG. 8 is a schematic diagram of a controller and associated components cooperating with the machine of FIG. 1.

Referring to FIG. 8, terminal DR of controller 100 is connected to the input of driver amplifier 31 whose output connects to pneumatic valve 33 in order to control pneumatic pressure at the roulette wheel's compartment doors (that is, the pneumatic pressure applied through conduit 82 of FIG. 7 to thrust O-ring 80 against door 138). This controller feature is optional since in some embodiments the roulette wheel's compartment doors will be operated in a different manner.

Controller 100 is a conventional microcontroller having digital memory, an analog-to-digital converter, and a digital-to-analog converter. In some embodiments the digital-to-analog converter can be built separately from the microcontroller, with a number of parallel data bits from microcontroller 100 operating switches in a resistive network to produce a quantized analog signal in the usual fashion.

Controller 100 is shown with an output DP driving previously mentioned display panel 23. Output DP may be a serial port in which case panel 23 will have a converter to store the serial data and drive the display 23 appropriately. In some cases, display 23 may have an LCD display divided into a grid of alphanumeric characters. In other embodiments, display 23 may have a graphics card for displaying unrestricted graphical information in color. Fast-changing graphics will be handled more conveniently if the output DP is a parallel port. Where one or more parallel ports are expected, controller 100 may send the different classes of information over a common bus in the usual manner.

There are many versatile and powerful microcontrollers that offer the appropriate features to perform the functions desired for this application. For example, Silicon Laboratories model C8051F312 has a built-in analog-to-digital converter, flash memory, and a number of pins that can be arranged to act as any one of a variety of input/output ports (serial or parallel ports, comparator input, timers, latches, etc.).

Terminal MR of controller 100 is connected to the input of driver amplifier 88 whose output connects to previously mentioned motor 26 in order to start and stop the motor. Motor 26 is shown here connected to previously mentioned roulette wheel 34. The magnitude of the signal of terminal MR may be varied in order to adjust the speed of motor 26.

As described before, wheel 34 has a number of ball sensors providing a detection signal on lines 89. Input/output device 90 includes combinational logic that responds to ball rest position signals issued on lines 89 and transmits in response a multi-bit outcome signal to terminal SL of controller 100. Terminal SL can also send command signals through device 90 in order to operate wheel features such as releasing the ball from wheel 34 by opening its door (door 38 of FIG. 2).

Shooting station SS1 schematically illustrates previously mentioned elevator 44, solenoid 62, and plunger sensor 76. As a before, sensor 76 is able to detect the previously described plunger (see disk 70 of FIG. 6). In this embodiment sensor 76 is simply a light detector acts as a normally open switch that closes when the plunger is released and returns to its start position. In other embodiments sensor 76 may include a stress gauge or an accelerometer for producing an analog signal signifying the magnitude of the plunger momentum or impulse. In still other embodiments, sensor 76 may be replaced (or supplemented with) previously mentioned, optional sensor 74, which can produce an analog signal signifying the travel distance the plunger was retracted.

Elevator 44 is shown actuated by an electrically controlled, pneumatic valve P that can switch pressure from a pneumatic source (not shown) to the elevator. Valve P is operated by the output of buffer amplifier A1 whose input is connected to terminal EL1 of microcontroller 100. Also, sensor 76 is connected between ground and terminal PL1 of microcontroller 100. Solenoid 62 is operated through the output of low pass filter F1, which also includes a buffer amplifier. The input of filter F1 is connected to terminal SH1 of microcontroller 100.

In embodiments accommodating multiple players, more than one shooting station can be a provided. This possibility is indicated by shooting station SSn having components identical to those of station SS1 and therefore labeled with the same reference numbers. The series of dots between the two stations indicates the possibility of more than two stations. As before, buffer amplifier An drives pneumatic valve P of station SSn, while buffered filter Fn drives solenoid 62. Also, the inputs of components An and Fn are connected to terminals ELn and SHn, respectively, of controller 100. Furthermore, sensor switch 76 of station SSn is connected between ground and terminal PLn of controller 100.

Player station PS1 is shown connecting to controller 100, but two or more player stations may be accommodated as indicated by player station PSn and a series of intervening dots. Each of the player stations has identical components, which are marked with the same reference numbers. Thus in player station PS1 previously mentioned player console 29 connects to bidirectional serial port KB1 of controller 100. Also, previously mentioned printer 27 is driven by serial port PR1 of controller 100. Previously mentioned currency acceptor 25 is connected to serial port CH1 of controller 100. In player station PSn devices 25, 27, and 29 are connected to serial ports CHn, PRn, and KBn, respectively.

Figure 9:
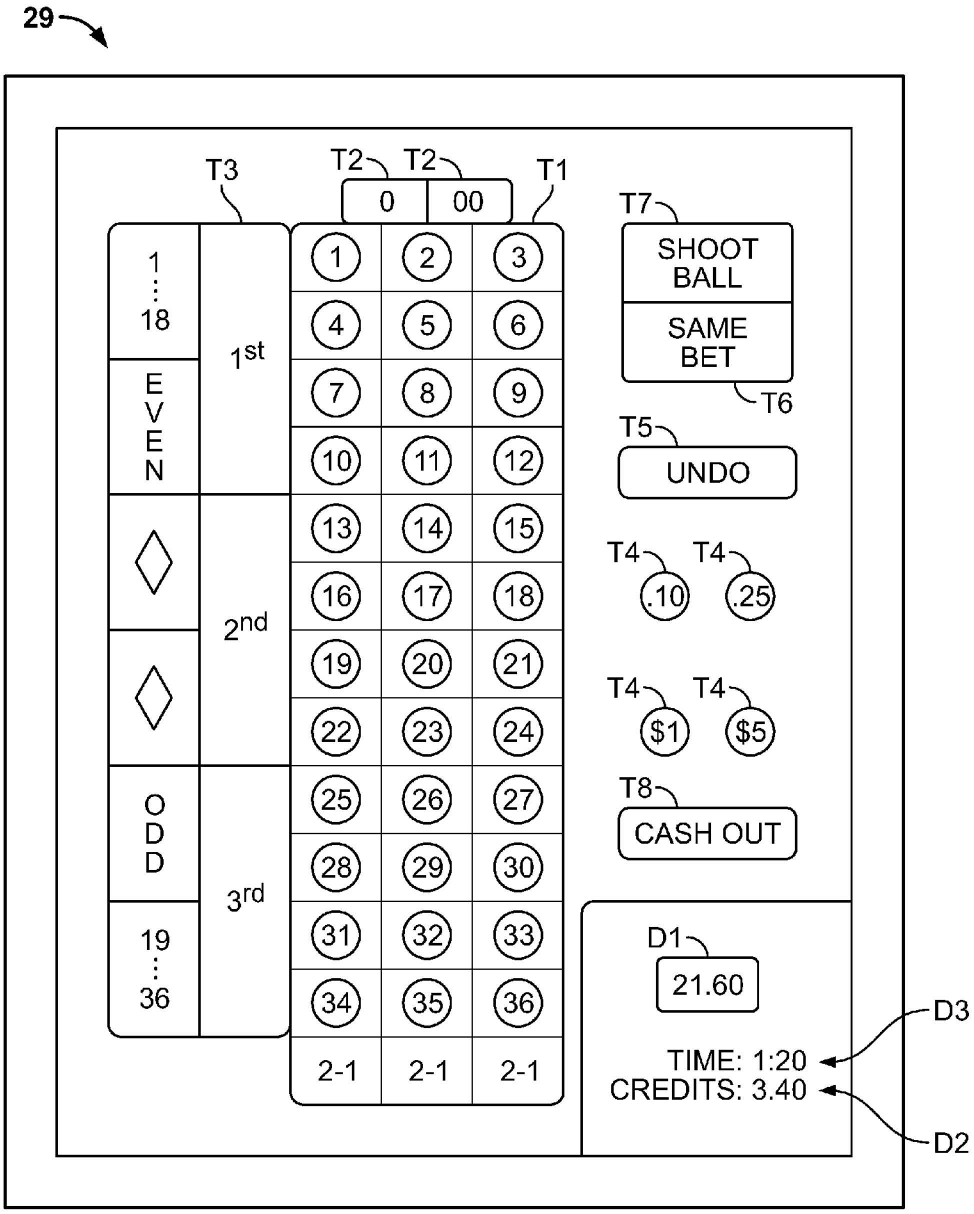
FIG. 9 is a front view of the console of FIG. 1.

Referring to FIG. 9, the illustrated console 29 has a touch-screen with a number of touch pads (these pads also being referred to as manually operable elements). The 13×3 matrix of touch pads T1 has its first 12 rows assigned to bets for the roulette numbers 1-36 and are marked with colors and numbers in the conventional way. The three touch pads of the bottom row of matrix T1 are used to indicate a column bet, that is, a bet on the first twelve numbers of the column. The two touch pads T2 are used to indicate bets on the numbers 0 and 00 and are colored green.

Touch pads T3 are arranged in two columns. The right column of pads T3 is used to place dozen bets, that is, bets on the first 12, second 12 or last 12 numbers of matrix T1, in that order. The left column of pads T3, starting from the top, is used to indicate a bet on (1) numbers 1-18, (2) even numbers, (3) red numbers, (4) black numbers, (5) odd numbers, and (6) numbers 19-36.

Touch pads T4 are used to designate the size of a wager and are marked: 0.10 (a dime), 0.25 (a quarter), $1, and $5. Touch pads T5, T6, T7, and T8 are marked UNDO, SAME BET, SHOOT BALL, and CASH OUT, respectively, for purposes to be described presently.

Console 29 also has a number of displays that are not touch pads. Display D1 indicates the size of a wager. Display D2 indicates the credits in dollars from which the player can draw funds to place bets. The legend "CREDITS:" is static and may be a part of a dynamic display or may simply be printed and, optionally, backlit. Similarly for display D3 the legend "TIME:" is also static and may be treated in a similar fashion. The dynamic part of display D3 is an indication in minutes and seconds of the time remaining to place a bet.

To facilitate an understanding of the principles associated with the foregoing apparatus, its operation will be briefly described. The gaming machine of FIG. 1 may stand alone or be one of a cluster of similar machines in, for example, a casino. If unattended for a predetermined period of time, controller 100 may go into an attract mode and send appealing messages through port DP to display 23. It will be assumed at this time that ball B is resting atop piston 52 as shown in FIG. 5.

A player begins by sitting at the machine and inserting currency into currency accepting device 25, which in turn sends a signal to input port CH1 of controller 100 (FIG. 8). In response, controller 100 sends an output through port KB1 to console 29. Console 29 stores and then shows at display D2 (FIG. 9) the amount of currency thus accepted. In some embodiments the gaming machine will have a credit card reader allowing the player to draw funds against a credit card.

The player can then place a bet in a manner to be described presently. Once a player begins entering a bet, controller 100 (FIG. 8) issues a lift command on terminal EL1 that is conveyed through driver amplifier A1 to operate pneumatic valve P and lift elevator 44. As a result ball B will be lifted atop piston 52 (start position shown in FIG. 5) so that gully 54 and ball B align with shooting path 22 (FIG. 6).

The player can wager a specific amount by pressing touch pads T4. For example to wager $21.60 player will depress the $5 pad four times, the $1 and once, the quarter pad twice, and the dime pad once. It will be understood that these pads need not be depressed in any specific order. These depressions will be sent to port KB1 of controller 100 (FIG. 8), which will in turn issue a cumulative total signal from that port for display at display D1 (FIG. 9). At the same time controller 100 will deduct that wager from the player's credits and show the remaining credits on display D2.

The player can then select a roulette number or combination thereof using pads T1, T2, or T3. For example, a player can make a straight bet by selecting one of the 38 numbers (1-36, 0, and 00) among touch pads T1. By depressing more than one number in compliance with conventional betting patterns, a player can choose any of the following bets: split (two adjacent numbers), street (single row), corner (a square of four adjacent numbers), line (two adjacent rows), 5-number bet (1, 2, 3, 0, 00). Non-conventional betting patterns can be chosen should the player select number patterns different from the foregoing conventional ones. The player can also make a column bet by pressing one of the three touch pads in the bottom row of the matrix T1.

The player can instead make dozen bets by pressing any one of the three touch pads in the right column of region T3, thereby selecting either numbers 1-12, 13-24, or 25-36. Using the touch pads in the left column of region T3, the player can place a bet on low numbers, even numbers, red numbers, black numbers, odd numbers, or high numbers, in that order.

This first bet will now be complete and in this embodiment, irrevocable. At this time controller 100 will set a timer to allow for additional bets. In this embodiment controller 100 will issue a four-minute signal that will be shown at display D2. This time signal will countdown second by second, during which interval the player can place additional bets in the manner just described. By pressing the UNDO touchpad T5 the player can cancel the prior bet, except if that prior bet was the first, irrevocable bet. The player can end the countdown by pressing the SHOOT BALL touchpad T7 or by operating plunger handle 68.

If the player retracts plunger handle 68, rod 66 and disk 70 will retract, thereby compressing spring 72 (FIG. 6). Controller 100 senses this retraction through the opening of sensor switch 76 (FIG. 8) connected to terminal PL1. In response controller 100 issues a motor start signal through terminal MR and driver amplifier 88 to start motor 26 and rotate roulette wheel 34. In this embodiment, the speed of motor 26 will be varied from round to round (e.g., over a range of +/−10%) to prevent players from developing an ability to reliably target a wheel position. Relatively random variations may be achieved with ordinary programming modules that create a "random" function or by using a physical, random noise source to create randomness. The adjustments produced are not revealed in advance and do not fit an easily recognized pattern and are, in that sense, irregular. Specifically, controller 100 is programmed to drive wheel 34 at a speed that is automatically and irregularly adjusted over time in order to impair a player's ability to predict ball arrival at the wheel.

When plunger handle 68 is released, spring 72 drives disk 70 to interrupt light arriving at sensor 76 to close a switch, that is, switch 76 connected to input PL1 of controller 100 (FIG. 8). As previously noted, sensor 76 can be replaced with a sensor to indicate the momentum or impulse produced by disk 70 and transmit that signal to controller 100. Additionally (or alternatively) optional sensor 74 (FIG. 6) can send to controller 100 a signal indicating the length by which handle 68 was retracted.

Although play can be initiated by using plunger handle 68, controller 100 can also respond to either a timing out (countdown display D3) or depression of the SHOOT BALL pad T7. Either of these events will cause controller 100 to start motor 26 and turn wheel 34 as described above.

Whether motor 26 is started in this manner or in response to retraction of plunger handle 68, wheel 34 will have a mechanism to close each of its doors 38. In the embodiment of FIG. 7 since torsion spring 86 has already closed each of the doors 138, pneumatic pressure will be applied through channel 82 to expand O-ring 80 against each of the doors 138 to keep them closed.

With all these tasks completed, controller 100 issues a control signal on terminal SH1, which is conveyed through buffered filter F1 to solenoid 62. The magnitude of this control signal can be adjusted in amplitude, duration or both. For example, the control signal on terminal SH1 can be pulse-width-modulated (one or a series of pulses) to adjust the amplitude, duration and the profile of the signal's rising and falling edge. In some embodiments the signal on terminal SH1 can be adjusted based on any received analog sensor signals indicating the plunger impulse or the retraction distance.

In this embodiment, however, controller 100 will be insensitive to the dynamics of plunger 66/68/70 and will produce a signal on terminal SH1 that randomly or quasi-randomly varies from round to round simply to make ball dynamics unpredictable. Randomness may be achieved with ordinary programming modules that create a "random" function or by using a physical, random noise source to create randomness. The adjustments produced by this random feature are not revealed in advance and do not fit an easily recognized pattern and are, in that sense, irregular. Specifically, controller 100 is programmed to drive ball striker 62/64 by an amount that is automatically and irregularly adjusted over time in order to impair a player's ability to predict ball motion. In one embodiment the signal on terminal SH1 varies randomly over a range of +/−10%, although a different range may be employed in other embodiments.

The electrical signal of terminal SH1 applied through buffered filter F1 electromagnetically actuates solenoid 62 (FIG. 6) and outwardly drives plunger 64 against ball B to send it down shooting path 22. As shown in FIGS. 2 and 3 path 22 has an outlet 24 in beveled sidewall 15. The ball's momentum causes ball B to orbit on sidewall 15, eventually spiraling down into spinning roulette wheel 34. Around this time controller 100 will send a signal through terminal MR and driver amplifier 88 to remove power from motor 26. Accordingly, wheel 34 will decelerate due to inherent (or applied) friction as ball B descends into the region of compartments 36 to tumble and eventually land into one of the compartments. At this time all the compartment doors will be closed as shown in FIG. 2 for door 38'.

Also at this time, controller 100 terminates the lift command on terminal EL1 and in response amplifier A1 issues a command to control valve P to remove pressure from elevator 44. Consequently, piston 52 returns to the position shown in FIG. 5.

When wheel 34 comes to a stop, its ball sensor will report to the controller (controller 100 of FIG. 8) in which compartment ball B has come to rest. This may be done with optical sensors that after a delay interval, issue a command to open the door 38 where the ball B is resting. For the embodiment of FIG. 7, pneumatic pressure will be released from channel 82, allowing O-ring 82 to collapse so that door 138 swings open under the weight of ball B. When door 138 swings to the position shown in phantom, continuity with electrical contact 84 is broken and that condition is reported along lines 89 (FIG. 8) to converter 90, which in turn issues a multi-bit signal to port SL to indicate the ball rest position.

Controller 100 displays the winning number by issuing a report from port DP to display 23. Controller 100 also compares the ball rest position to the bet or bets previously placed by the player. If the ball rest position matches the criteria for any of the player's bets, an announcement will be sent from port DP to display 23. Also, controller 100 will use a table stored in memory to look up the odds for each winning bet and calculate the winnings on each wager. These winnings will then be added to the credit report on display D2 (FIG. 9).

In the meantime ball B will fall below wheel 34 into basin 12. Floor 12B is pitched to send ball B to outlet 16 so that the ball can roll down return track 18. Eventually ball B runs against gate 56 (FIG. 5) and temporarily lifts the gate before landing in gully 54 of piston 52, so that gate 56 can return to the position illustrated in FIG. 5.

The player can now place new bets in the manner just described. Alternatively, the same bet can be played by pressing SAME BET pad T6.

When the player is done, CASH OUT pad T8 is pressed to send an appropriate signal to terminal KB1 of controller 100 (FIG. 8). In response controller 100 issues commands through port CH1 causing printer 25 to print a receipt indicating the amount due the player. Alternatively, the credit can be automatically and electronically credited to the player's credit card.

Figure 10:
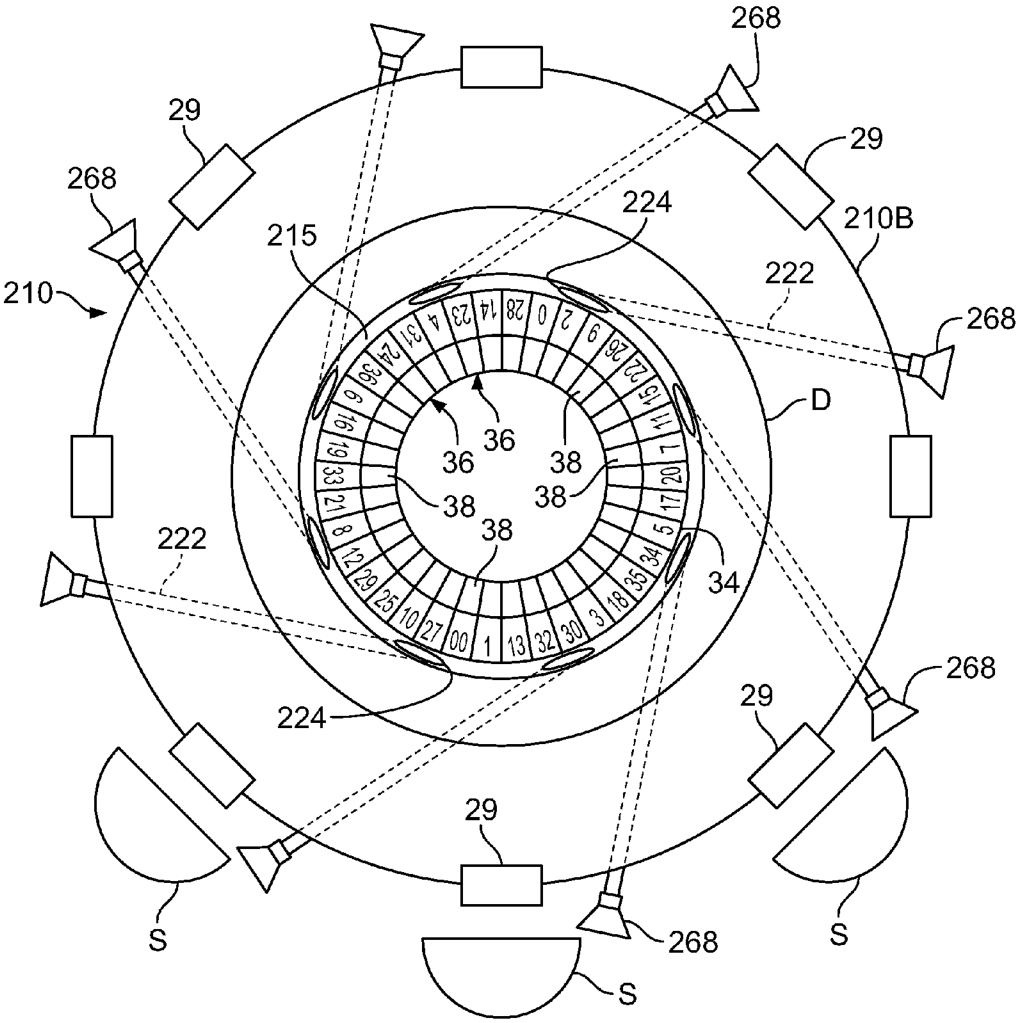
FIG. 10 is a plan view of a game machine that is an alternate to that of FIG. 1.
Figure 11:
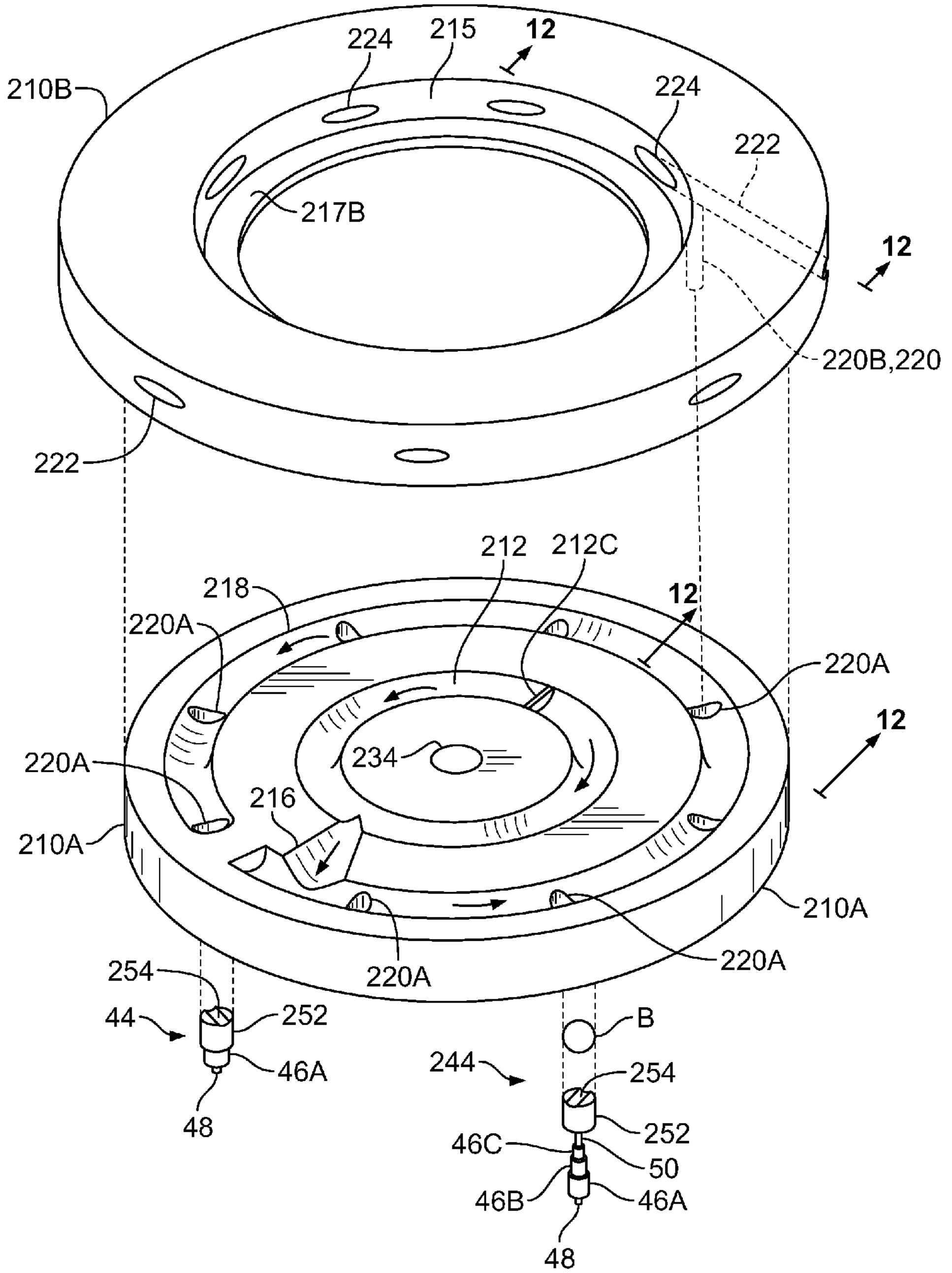
FIG. 11 is an exploded, perspective view of the base, an overlying top and associated elevators employed in the embodiment of FIG. 10.
Figure 12:
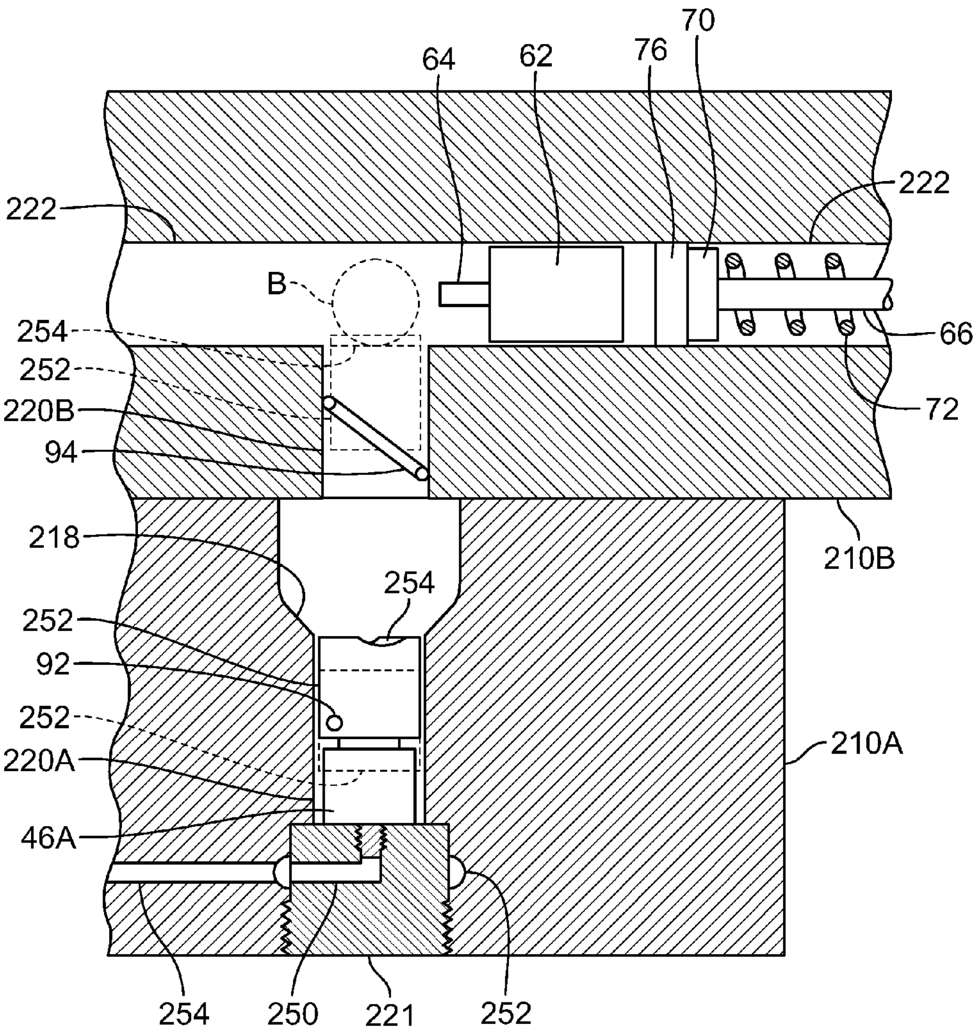
FIG. 12 is a detailed, fragmentary, elevational view of the elevator shaft of FIG. 11, partly in section, and showing its intersection with the return track and shooting path.

Referring to FIGS. 10-12, components identical to those previously described bear the same reference numerals, while components corresponding to those previously described have a similar reference numeral but increased by 200. The illustrated gaming machine is shown as a table 210 having an annular top 210B overlaying and attached to lower cylindrical base 210A. A cylindrical shroud (not shown) may be placed around base 210A and may support top 210B from below. Top 210B has eight of the previously described consoles 29 mounted at the periphery of the table at equiangularly spaced positions. Seats S may be placed in front of each of the consoles 29, three such seats being illustrated in FIG. 10.

Table top 210B has a flat annular surfaces on the topside and underside and a cylindrical sidewall penetrated horizontally by eight, equiangularly spaced, cylindrical shooting paths 222, each skewed about 30° clockwise from a radial alignment. The inner outlets 224 of paths 222 emerge on beveled annular sidewall 215 which overhangs sloped annular shelf 217B in a manner similar to walls 15 and 17B of FIG. 2. Each of the paths 222 are intersected from below by blind bore 220B acting as the upper portion of an elevator shaft 220 for carrying ball B.

Base 210A is shown as a molded cylindrical slab having a concentric bore 234 encircled by an arcuate course 212 in the form of a gully with a semicircular cross-section and following a circular path. Course 212 slopes downwardly away from semicircular disk 212C mounted athwart course 212. Located at the low point of course 212, diametrically opposite to disk 212C, is sloped entryway 216. Entryway 216 radially intersects course 212 and slopes downwardly therefrom to radially intersect return track 218.

Track 218 is shown as a gully with a floor having a semicircular cross-section. Track 218 follows an interrupted circular path, starting at entryway 216 and traveling counterclockwise 350°. Track 218 is sloped so that after arriving from entryway 216, ball B will roll counterclockwise. Cylindrical elevator shafts 220A vertically intersect track 218 at eight equiangularly spaced positions, starting at a position immediately downstream of entryway 216. Each of the shafts 220A is aligned with one of the upper shafts 220B in table 210B to form a shaft 200.

Elevator 244 has piston rod 50 and pneumatic lift elements 46A, 46B, and 46C, which are identical to that previously described in FIG. 4. As before, fitting 48 is shown threaded into an axial bore in plug 221 and communicating with radial passage 250 in the plug. With plug 221 screwed into position as shown, passage 250 communicates with an annular groove 252 that in turn communicates with pneumatic passage 254.

Piston 252 is similar to the one previously described in that this piston also has a cylindrical sidewall and a frustro-cylindrical gully 254. In this embodiment, however, piston 252 is mounted to rotate axially around rod 50. Piston 252 has a torsion spring (not shown) that biases it to the neutral position shown in FIG. 12, in which position gully 254 is aligned with track 218 so ball B a can roll through track 218 and over gully 254 unimpeded.

As shown in FIG. 12 piston 252 has on its side a hemispherical nub 92, a complementary nub being located on the diametrically opposite side of piston 252. A ridge or thread 94 is shown spiraling 180° on the inside of upper elevator shaft 220B. A second thread start will be located on the opposite side of elevator shaft 220B so there will be two thread starts for the two nubs 92 on piston 252.

Previously described solenoid 62 with plunger 64 is shown mounted in shooting path 222 at the outlet of upper elevator shaft 220B. The previously described, manually operable plunger is shown partially as rod 66 and helical compression spring 72, with striker disk 70 shown bearing against previously described sensor 76.

The operation of the embodiment of FIGS. 10-12 will be described assuming wheel 34 is initially stationary and ball B is in one of the compartments 36.

A player operating one of the consoles 29 (FIG. 10) may place the first bet using the techniques described before. Also as before, controller 100 (FIG. 8) will respond to the first bet by starting a timer and providing a timed countdown at display D3 (FIG. 9). In this embodiment, the countdown allows other players at other consoles 29 to also place bets. Accordingly, the SHOOT BALL pad T7 will be inoperable during the countdown interval.

Once betting begins, controller 100 (FIG. 8) will determine which player will next shoot ball B. Unless only one player is present, shooting privileges can rotate clockwise. The privilege can be shifted after every play, or may shift only after the current shooter meets some predetermined criteria; e.g., no winnings on the last play.

Controller 100 will now issue a retract command on that one of the terminals EL1-ELn corresponding to the player that will have shooting privileges. The associated piston 252 will then descend to the lowermost position in shaft 220A, shown in phantom in FIG. 12 below the normal position of piston 252 (normal position illustrated in solid lines). All other pistons 252 will be held in the normal position.

Controller 100 will now issue a command signal on terminal SL thereby causing device 90 to open the door 38 (FIG. 2) supporting the ball B. Consequently, ball B will fall into course 212 (FIG. 11) and roll downhill and through entryway 216 into track 218 in a position upstream of all elevator shafts 220A. In all but one of the elevator shafts 220A, pistons 252 will be in the normal position so that their gullies 254 will be aligned with track 218, allowing ball B to smoothly roll by.

In the elevator shaft 220A corresponding to the player with shooting privileges, piston 252 will have retracted to the lowermost position, shown in phantom in shaft 220A in FIG. 12. Therefore, ball B will not roll by but will fall into this shaft 220A, which has this depressed piston 252.

Controller 100 (FIG. 8) will wait for a predetermined amount of time sufficient to allow ball B to complete its travel and settle into one of the elevator shafts 220A. Alternatively, ball sensors, such as optical sensors, can detect ball arrival. Thereafter, controller 100 will issue an up command over that one of the terminals EL1-ELn corresponding to the depressed elevator 44 (piston 252). Consequently, piston 252 (FIG. 12) will rise into upper shaft 220B to the position shown in phantom, carrying ball B to the position shown in phantom in shooting path 222. As piston 252 travels through upper shaft 220B nubs 92 will engage the spiral ridges 94 to rotate and align gully 254 with shooting path 222

When the countdown interval of display D3 (FIG. 9) concludes, the player with shooting privileges may exercise that privilege by touching pad T7. Alternatively, the player can manually shoot the ball B by pulling back plunger handle 268 (FIG. 10) and releasing it so that spring 72 (FIG. 12) drives disk 70 to interrupt light arriving at sensor 76 (see also switch 76 of FIG. 8). On the other hand, if no action is taken for a preprogrammed delay interval following the conclusion of the countdown interval, controller 100 (FIG. 8) will shoot ball B automatically.

Upon the occurrence of any of these three shooting contingencies (automatic, plunger, or touchpad), controller 100 will start the roulette wheel by issuing a command from terminal MR. Controller 100 will also issue a shoot signal on the appropriate one of the terminals SH1-SHn to operate solenoid 62 so that plunger 64 (FIG. 12) will strike and propel ball B through shooting path 222 as before.

Ball B will emerge from outlet 224 of path 222 and roll on bevelled surface 215 (FIG. 10). Each of the outlets 224 may be fitted with a rubber curtain allowing ball ejection while later allowing ball B to roll on surface 215 over the outlets 224. Ball B will spiral down from surface 215 onto wheel 34 and began tumbling over the compartments 36, eventually landing in one of them. Following its preprogrammed timing sequence, controller 100 (FIG. 8) will now issue a command from terminal MR to stop wheel 34. The sensors of wheel 34 will issue on lines 89 an outcome signal indicating in which of the compartments 36 ball B came to rest.

Device 90 will convey this outcome to terminal SL and in response, controller 100 will show the outcome on display 23. Controller 100 will also determine which of the players' prior bets won and increase the amounts on their credit displays D2 (FIG. 9) accordingly.

Players can now again place bets and the foregoing cycle will repeat so long as players remain who have not cashed out.

Figure 13:
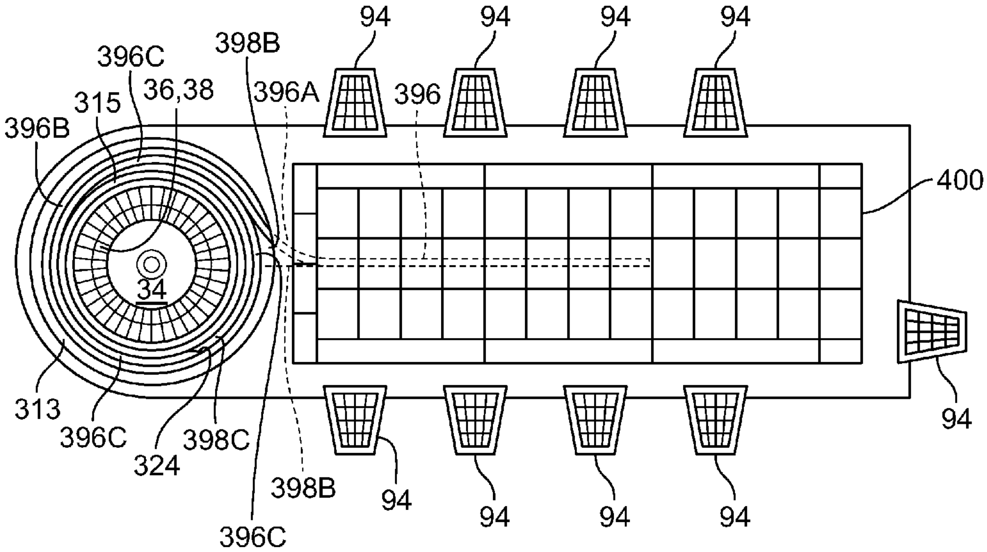
FIG. 13 is a plan view of the game machine that is an alternate to that of FIGS. 1 and 10.
Figure 14:
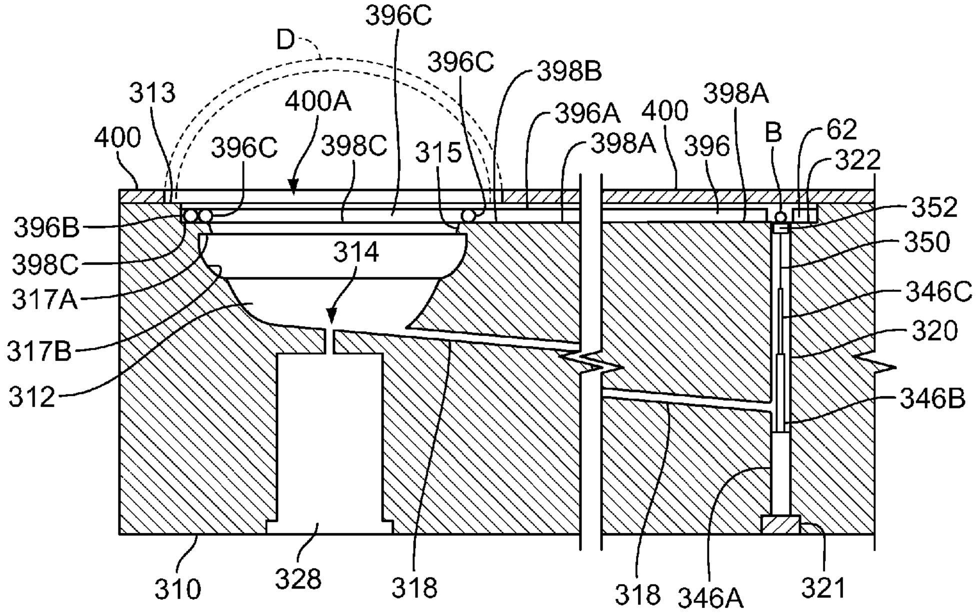
FIG. 14 is a fragmentary, elevational view of the machine of FIG. 13, partly in section, and with certain components removed to clarify the illustration.

Referring to FIGS. 13 and 14, components identical to those previously described bear the same reference numerals, while components corresponding to those previously described in FIGS. 1-7 have a similar reference numeral but increased by 300. A long roulette table has a base 310 with a transparent cover panel 400 with a circular opening 400A, which exposes an annular landing 313 on the top of base 10. Landing 313 is fitted with previously mentioned dome D. Panel 400 is printed with the markings 400B typically found on a roulette table.

Since panel 400 is transparent, pipe 396 is visible and its proximal end is mounted in gully 398A formed atop base 310. Gully 398A extends in a straight line before flaring into a roughly triangular region 398B. Region 398B forms a T-intersection with circular ledge 398C. Pipe 396 has (a) a transition section 396A that turns to the right in region 398B, and (b) two turns 396B and 396C that spiral inwardly and end in diagonal opening 324. Pipe 396 provides a shooting path in that ball B can travel through the pipe from a starting end to a finishing end, which terminates in approximately two spiral turns.

The inside edge of ledge 398C reaches a bevelled annular sidewall 315 overlying an undercut comprising an annular overhang 317A. Overhang 317A hangs over a curved annular wall 317B. Wall 317B funnels into lower basin 312, which has a circular floor with a concentric shaft hole 314 leading into a motor compartment 328. As before, previously described wheel 34 can be installed in undercut 317A/317B.

A motor (not shown) in compartment 328 will have a shaft extending through hole 314 to drive wheel 34.

Basin 312 empties into return track 318. Track 18 is inclined downwardly and intersects an upright, circular elevator shaft 320, which is closed by plug 321. Shaft 320 rises to intersect a horizontal gully 322, which is aligned with the inside of pipe 396. Gully 322 together with pipe 396 is herein referred to as a shooting path. A ball striker is shown as previously described solenoid 62, which can be used to propel ball B out of path 322 and into pipe 396.

An elevator is shown as a telescopic actuator having three telescopically interconnected cylinders 346A, 346B, and 346C, which can be extended or retracted by applying pneumatic pressure through threaded plug 321. Piston rod 350 projects upwardly from cylinder 346C to cylindrical piston 352, which has on top a transverse gully with a curvature designed to match that of ball B (see piston 52 of FIG. 4).

The operation of the embodiment of FIGS. 13-14 will be described assuming wheel 34 is initially stationary and ball B is in one of the compartments 36.

A player operating one of the consoles 29 (FIG. 13) may place the first bet using the techniques described before. Also as before, controller 100 (FIG. 8) will respond to the first bet by starting a timer and providing a timed countdown at display D3 (FIG. 9). In this embodiment, the countdown allows other players at other consoles 29 to also place bets. Accordingly, the SHOOT BALL pad T7 will be inoperable during the countdown interval. Once betting begins, controller 100 (FIG. 8) will determine which player will next shoot ball B as described before.

Controller 100 will now issue a command on terminal EL1 (station SS1 is solitary) causing piston 352 to descend to the lowermost position in shaft 320. Controller 100 will now issue a command signal on terminal SL thereby causing device 90 to open the door 38 (FIG. 13) supporting the ball B. Consequently, ball B will fall into basin 312 and roll downhill into track 318 and into elevator shaft 320, landing atop piston 352. After ball B has settled atop piston 352 controller 100 will issue an up command on terminal EL1, causing piston 352 to rise into the position shown in FIG. 14 and carry ball B into alignment with shooting path 322.

When the countdown interval of display D3 (FIG. 9) concludes, the player with shooting privileges may exercise that privilege by touching pad T7. On the other hand, if no action is taken for a preprogrammed delay interval following the conclusion of the countdown interval, the shooting sequence will start automatically. In either event, controller 100 (FIG. 8) will shoot ball B just after starting the roulette wheel in the manner previously described.

Ball B will be driven by solenoid 62 into pipe 396 and will travel through transition section 396A before making approximately 2 turns through pipe sections 396B and 396C, eventually emerging from outlet 324. Ball B will spiral over beveled surface 315 onto wheel 34 and begin tumbling over the compartments 36, eventually landing in one of them. Following its preprogrammed timing sequence, controller 100 (FIG. 8) will now issue a command from terminal MR to stop wheel 34. The sensors of wheel 34 will issue on lines 89 an outcome signal indicating in which of the compartments 36 ball B came to rest.

Device 90 will convey this outcome to terminal SL and in response, controller 100 will show the outcome on display 23. Controller 100 will also determine which of the players' prior bets won and increase the amounts on their credit displays D2 (FIG. 9) accordingly. Players can now again place bets and the foregoing cycle will repeat so long as players remain who have not cashed out.

It is appreciated that various modifications may be implemented with respect to the above described embodiments. Some embodiments may employ a plurality of balls that are queued at the elevator so that a ball may be served to the solenoid shooter even while another ball is resting in one of the compartments of the roulette wheel. While a solenoid-driven ball is illustrated, some embodiments may propel the ball with an air blast or may have an arrangement allowing players to manually propel the ball. Also, instead of a pneumatic piston, a ball can be lifted by a chain-driven cup, a wheel with lifting implements, an air blast, etc. Some machines may not deal with an ongoing credit, but will require the player to make discrete wagers that are either completely consumed or are immediately paid off by issuing a credit ticket.

Some embodiments may implement progressive betting where players can make payments with other players into a pool that pays the current pool players upon the occurrence of certain events. Examples of events could be (a) having a zero number (0 or 00) occurring three times in a row; (b) any color repeating six times in a row; (c) odd (or even) numbers occurring six times in a row; or (d) the same number repeating three times in row.

Obviously, many modifications and variations of the present invention are possible in light of the above teachings. It is therefore to be understood that within the scope of the appended claims, the invention may be practiced otherwise than as specifically described.

The invention claimed is:

1. A game machine played with a ball comprising:

a motor-driven, concave wheel with a plurality of circumferentially spaced compartments, each being operable to hold temporarily and release the ball, said wheel being operable to produce an outcome signal indicating ball rest position;

at least one ball striker for propelling the ball along a shooting path into said wheel;

a base for rotatably supporting said wheel, said base having a return track for directing the ball upon release from said wheel toward a position below the at least one ball striker;

an elevator for lifting the ball from said return track to said at least one ball striker; and a controller coupled to said wheel, said controller having at least one console manually operable to record in said controller a player's bet, said controller being operable to provide a signal indicating whether the player's bet has won based on the outcome signal.

2. A game machine according to claim 1 wherein said return track services all of the plurality of compartments by invariably returning the ball to a single destination for lifting by the elevator.

3. A game machine according to claim 2 wherein said at least one ball striker is singular and exclusively propels the ball into said wheel.

4. A game machine according to claim 1 wherein said at least one ball striker is operable through said controller.

5. A game machine according to claim 4 comprising:

a manually operable plunger having a plunger sensor coupled to said controller for providing thereto a shoot signal in response to operation of said plunger, said at least one ball striker being actuated by said controller in response to said shoot signal.

6. A game machine according to claim 5 wherein said controller drives said at least one ball striker by an amount that varies.

7. A game machine according to claim 5 wherein said controller is programmed to drive said at least one ball striker by an amount that is automatically and irregularly adjusted over time in order to impair a player's ability to predict ball motion.

8. A game machine according to claim 5 wherein said shoot signal has a magnitude indicating an operating parameter of said plunger, said at least one ball striker being driven by said controller an amount varying in correspondence with the magnitude of said shoot signal.

9. A game machine according to claim 5 wherein said shoot signal corresponds to at least one of travel distance and momentum of said plunger.

10. A game machine according to claim 1 wherein said controller is programmed to drive said wheel at a speed that is automatically and irregularly adjusted over time in order to impair a player's ability to predict ball arrival at the wheel.

11. A game machine according to claim 1 wherein said elevator comprises:
a piston reciprocatably mounted in said base and adapted to hold and lift the ball.

12. A game machine according to claim 11 wherein said elevator comprises:
a telescopic actuator attached under said piston for lifting it.

13. A game machine according to claim 12 wherein said telescopic actuator is fluid driven and responsive to a lift signal from said controller.

14. A game machine according to claim 11 wherein said piston has a gully on top sized to receive the ball.

15. A game machine according to claim 14 wherein said gully is aligned parallel to said shooting path.

16. A game machine according to claim 1 wherein said base has under said wheel a basin that funnels down to said return track.

17. A game machine according to claim 1 wherein said return track has a gate that is operable to allow one-way, forward passage of the ball from said return track to said elevator and prevent reverse motion back to said return track.

18. A game machine according to claim 1 wherein said base has under said wheel an arcuate course that declines to a sloped entryway feeding said return track.

19. A game machine according to claim 18 wherein said return track is pitched, said elevator comprising:
a plurality of pistons reciprocatably mounted at spaced positions along said return track, said at least one ball striker comprising a plurality of ball strikers, said plurality of pistons being operable to lift the ball to an associated one of said plurality of ball strikers.

20. A game machine according to claim 19 wherein said return track is arcuate, said plurality of ball strikers being distributed around said wheel and being oriented to propel the ball to approach said wheel approximately tangentially, said at least one console comprising a plurality of consoles, each associated with a different corresponding one of said ball strikers.

21. A game machine according to claim 1 wherein said return track is pitched and arcuate, said elevator comprising:
a plurality of pistons reciprocatably mounted at spaced positions along said return track, said at least one ball striker comprising a plurality of ball strikers distributed around said wheel, each having a shooting path oriented to propel the ball to approach said wheel approximately tangentially, said plurality of pistons being operable to lift the ball from a lower position at the return track to an upper position at an associated one of said plurality of ball strikers, each of said pistons having a gully on top and being operable to rotate the gully azimuthally into alignment with (a) said return track when at the lower position, and (b) the shooting path when at the upper position.

22. A game machine according to claim 1 wherein said shooting path has a final branch that spirals around said wheel, a starting branch radially aligned with said wheel, and a transition branch communicating between said starting and said final branch.

23. A game machine according to claim 22 wherein said final branch spirals through more than one turn about said wheel.

24. A game machine according to claim 1 wherein each of said compartments of said wheel comprises:
a door for temporarily supporting and for releasing the ball; and
a ball sensor for sensing ball position.

25. A game machine according to claim 1 comprising:
a currency accepting device.

26. A game machine according to claim 1 wherein said at least one console comprises a touch screen.

27. A game machine according to claim 26 wherein said touch screen comprises a plurality of touch pads corresponding to the compartments of said concave wheel.

28. A game machine according to claim 26 wherein said touch screen is operable to record player's bets in said controller and comprises an undo pad for cancelling a recorded bet.

29. A game machine according to claim 1 wherein said at least one console comprises a manually operable element for operating said at least one ball striker through said controller.

30. A game machine according to claim 1 wherein said controller is operable to automatically operate said at least one ball striker upon expiration of a predetermined delay following the player's bet.

31. A game machine according to claim 1 wherein said console is operable to record multiple player's bets and to cancel all but the first one of said player's bets.

32. A game machine according to claim 1 comprising:
a display for displaying the ball rest position.

33. A game machine according to claim 1 wherein said controller is operable to implement progressive betting in that a portion of wagers are accumulated and carried from round to round until a predetermined criteria is satisfied.

* * * * *